US007393372B2

(12) United States Patent
Cassell et al.

(10) Patent No.: US 7,393,372 B2
(45) Date of Patent: Jul. 1, 2008

(54) AIR CLEANER FOR AN AIR INDUCTION ASSEMBLY HAVING PRIMARY AND SECONDARY INLETS

(75) Inventors: Hovie J. Cassell, White Lake, MI (US); David J. Steinert, Commerce, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 459 days.

(21) Appl. No.: 11/050,544

(22) Filed: Feb. 3, 2005

(65) Prior Publication Data

US 2006/0168920 A1 Aug. 3, 2006

(51) Int. Cl.
*B01D 46/00* (2006.01)
*F02M 35/02* (2006.01)

(52) U.S. Cl. .............................. 55/310; 55/312; 55/313; 55/385.3; 55/419; 55/DIG. 28; 123/198 E

(58) Field of Classification Search .................. 55/310, 55/312, 313, 385.3, 419, 428, DIG. 28; 123/198 E
See application file for complete search history.

(56) References Cited

U.S. PATENT DOCUMENTS

| | | | | |
|---|---|---|---|---|
| 2,766,845 | A * | 10/1956 | Raymond | 55/312 |
| 3,077,715 | A * | 2/1963 | Carroll | 55/313 |
| 3,459,163 | A | 8/1969 | Lewis | |
| 3,513,517 | A | 5/1970 | Kearsley | |
| 3,612,024 | A * | 10/1971 | Bandimere | 123/198 E |
| 3,877,908 | A | 4/1975 | Phelps et al. | |
| 4,077,787 | A | 3/1978 | Akado et al. | |
| 4,083,184 | A * | 4/1978 | Ushijima et al. | 55/385.3 |
| 4,351,476 | A * | 9/1982 | Rood, Jr. | 55/313 |
| 4,396,407 | A * | 8/1983 | Reese | 55/385.3 |
| 4,969,939 | A | 11/1990 | Machado | |
| 4,995,891 | A | 2/1991 | Jaynes | |
| 5,174,258 | A | 12/1992 | Tanaka | |
| 5,195,484 | A | 3/1993 | Knapp | |
| 5,400,753 | A * | 3/1995 | Andress et al. | 55/313 |
| 5,501,716 | A * | 3/1996 | Chiba et al. | 55/311 |
| 5,819,696 | A * | 10/1998 | Wada | 123/198 E |
| 6,346,130 | B2 * | 2/2002 | Suzuki | 55/313 |
| 6,395,048 | B1 * | 5/2002 | Yoder et al. | 55/385.3 |
| 6,423,108 | B1 | 7/2002 | Mueller | |

(Continued)

FOREIGN PATENT DOCUMENTS

| | | | |
|---|---|---|---|
| DE | 19545979 | | 6/1997 |
| JP | 2001-317421 | * | 11/2001 |

*Primary Examiner*—Jason M. Greene
(74) *Attorney, Agent, or Firm*—Brinks Hofer Gilson & Lione

(57) ABSTRACT

An air cleaner for a motor vehicle. The air cleaner includes a housing having side walls and a bottom wail defining a chamber. A filter is received within the chamber and cooperates with the housing to define a collection chamber. A primary inlet defines a primary passage into the collection chamber, and a secondary inlet defines a passage bypassing the collection chamber. The secondary inlet also includes a conduit, having an end abutting the filter. The air cleaner further includes a door positioned with respect to the secondary inlet so as to generally obstruct the secondary inlet when the door is in a closed position. The door is pivotable about weakened regions to an open position if the airflow through the primary passage is lower than a critical level.

19 Claims, 3 Drawing Sheets

U.S. PATENT DOCUMENTS

| | | | | |
|---|---|---|---|---|
| 6,425,930 | B1 | 7/2002 | Wake et al. | |
| 6,453,866 | B1 | 9/2002 | Altmann et al. | |
| 6,510,832 | B2 | 1/2003 | Maurer et al. | |
| 6,561,297 | B2 | 5/2003 | Yatagai et al. | |
| 6,564,768 | B2 | 5/2003 | Bauer et al. | |
| 6,705,272 | B2 | 3/2004 | Leipelt et al. | |
| 6,726,742 | B2 * | 4/2004 | Arden et al. | 55/419 |
| 2005/0247034 | A1 * | 11/2005 | Canova et al. | 55/385.3 |

* cited by examiner

AIR CLEANER FOR AN AIR INDUCTION ASSEMBLY HAVING PRIMARY AND SECONDARY INLETS

BACKGROUND

1. Field of the Invention

The invention relates generally to an air filter for an internal combustion engine. More specifically, the invention relates to an air cleaner having a primary inlet defining a primary passage and a secondary inlet defining a bypass passage that is opened when an airflow through the primary passage is lower than a critical level.

2. Related Technology

Air cleaners for internal combustion engines typically have an inlet positioned such that ambient air can flow unhindered into the air cleaner. Therefore, the air inlet is typically situated behind a radiator grill of the vehicle or in the vicinity of a fender. However, when the vehicle is operated in a heavy or blowing snowfall, snow can be aspirated into the air inlet and accumulate within the air filter housing. If a sufficient amount accumulates, the snow can obstruct the air filter inlet and may partially or completely obstruct air flow to the engine. Furthermore, when the vehicle experiences temperature changes, such as being moved in and out of a heated enclosure, the accumulated snow can melt and refreeze to form a layer of ice that interrupts the air supply to the engine.

In order to overcome the effects of an obstructed inlet, current air intake systems include a primary air inlet defining a primary opening into the air chamber and a secondary air inlet defining a second opening into the air chamber; the secondary inlet being positioned away from the front of the vehicle. However, during heavy snowfall, the secondary air inlet may become obstructed by swirling snow particles in a manner similar to that described above with respect to the primary inlet and snow from either inlet may obstruct the other.

One air intake system currently known in the art also includes a door positioned so as to substantially prevent air flow through the secondary inlet, except when desired to reduce noise, vibrations and harshness (NVH) and to improve engine efficiency. However, multiple, redundant air inlets may undesirably increase the air intake system NVH. Additionally, a secondary inlet door adds many different components, such as springs and multiple-component hinges, thus increasing part complexity.

Additionally, cool air is denser and thus provides more efficient engine operation than warm air. Therefore, it is desirable to draw cool, ambient air into the air intake system rather than air that has been heated by vehicle components.

In view of the above, it is desirous to provide an air intake system with a secondary inlet that does not become obstructed by snow entering through the primary inlet and that includes a simple mechanism for preventing airflow through the secondary inlet when not desired.

SUMMARY

In overcoming the drawbacks and limitations of the existing technology, an air cleaner for a motor vehicle is provided having a housing with side walls and a bottom wall defining a chamber, a filter cooperating with the housing to define a collection chamber, a primary inlet at least partially defining a primary passage into the collection chamber, and a secondary inlet defining a passage to the filter that bypasses the collection chamber.

In one aspect, the bypass passage includes a connecting portion that connects the first end of the passage to the housing so as to substantially prevent airflow from leaking into the collection chamber. More specifically, the connecting portion includes a flange engaging a portion of the housing. The second end of the conduit includes an increased diameter portion engaging the filter.

In another aspect of the present invention, the air cleaner includes a valve or door positioned with respect to the secondary inlet to substantially obstruct the secondary inlet when the door is in a closed position. A weakened portion thereof allows the door to pivot to an open position, if the first flow path becomes generally obstructed. More specifically, as the primary passage becomes obstructed, the engine attempts to continue to draw air into the air cleaner, and negative pressure causes the door to pivot into the open position.

In a further aspect, the door includes multiple portions, each pivotable about a respective weakened portion and having a generally triangular shape. The door portions cooperate to define a drain hole that prevents debris and moisture from accumulating within the secondary inlet.

Further objects, features and advantages of this invention will become readily apparent to persons skilled in the art after a review of the following description, with reference to the drawings and claims that are appended to and form a part of this specification.

DETAILED DESCRIPTION

Figure 1:
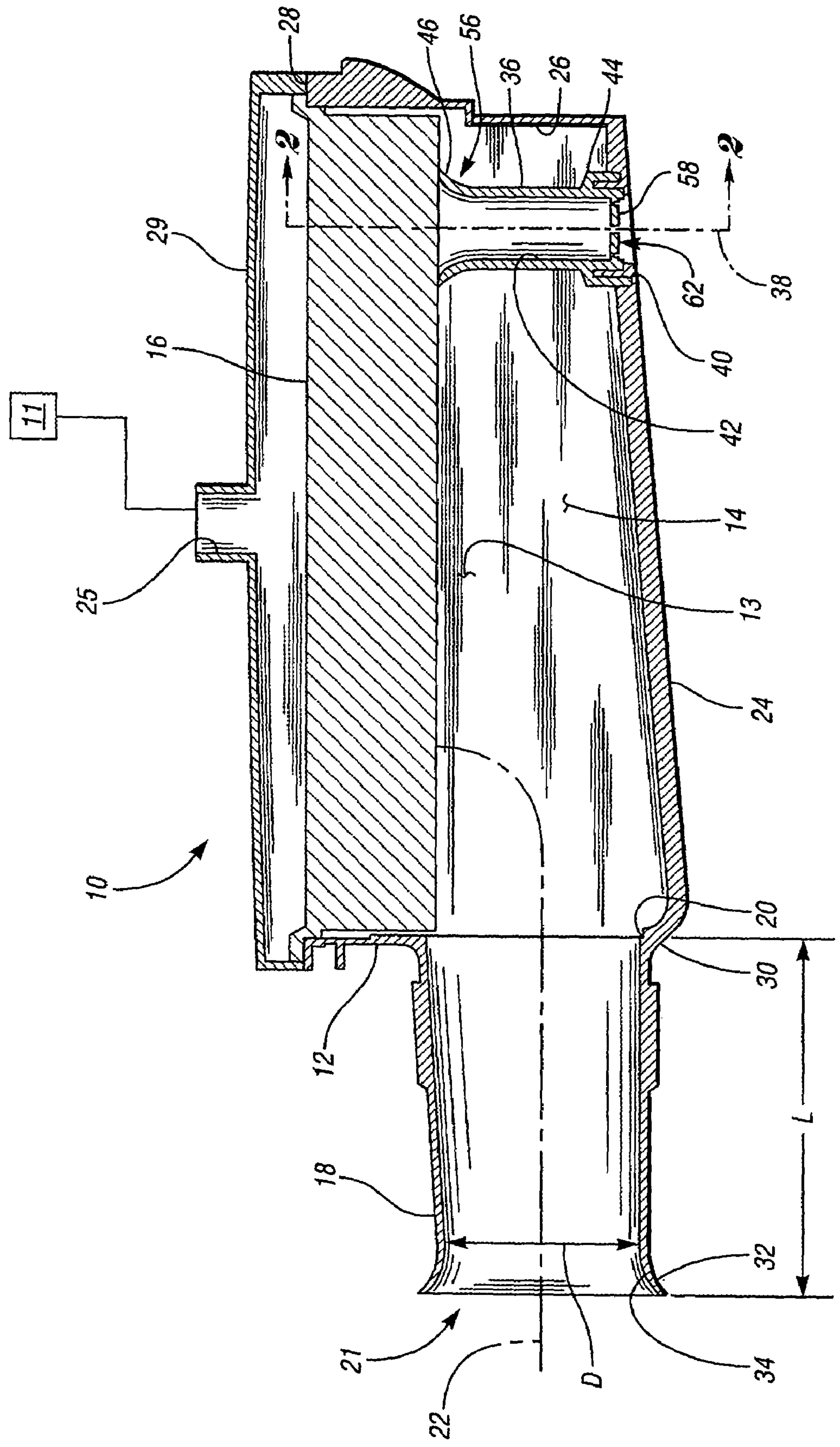
FIG. 1 shows a cross-sectional view of an air cleaner for an air intake system of a motor vehicle embodying the principles of the present invention and having primary and secondary inlets.

Referring now to the drawings, FIG. 1 shows an air cleaner 10 for an air intake system that supplies air to an engine 11 (schematically represented in the Figures). The air cleaner 10 includes a housing 12 defining a chamber 13 that receives a filter 16 to remove debris and particles from ambient air flowing into the air intake system. The housing 12 and the filter 16 cooperate to define a collection chamber 14 into which air is received and that collects the debris and particles. A primary inlet 18 cooperates with an opening 20 in the side wall of the housing 12 to define a primary passage 21 into the chamber 14 and to the filter. More specifically, ambient air flows through the primary inlet 18, into the collection chamber 14 along the first flow path 22, through the filter 16, and to the engine 11 via a duct 25.

Depending on its specific construction, the housing 12 may include a bottom wall 24 that collects debris and a side wall 26 that receives the filter 16 such that it extends across the housing. The filter 16 is a paper element having a series of corrugations or accordion-like folds, but any other appropriate configuration or material may be used. The top portion 28 of the housing 12 is secured to a housing cap 29 defining the duct 25 that leads to the engine 11.

Although the Figures show the housing 12 having a particular construction, these Figures are for illustrative purposes only. Therefore, the design of the housing 12 may vary as dictated based on the design criteria without affecting the scope of the present invention.

The primary inlet 18 includes a first end 30, adjacent to the opening 20, and a second end 32, located a length L from the first end 30. Furthermore, the primary inlet 18 includes a diameter D and has a ratio (L/D) that can be modified to minimize NVH and to comply with packaging requirements. If desired, the primary inlet 18 flared 34 adjacent to the second end 32. Alternatively, the primary inlet 18 may consist merely of the opening 20 defined by the housing 12 or a conduit extending into the collection chamber 14.

The opening 20 is defined by the side wall 26 and the primary inlet 18 is oriented such that it extends substantially parallel to the direction of travel of the vehicle. Oriented this way, a sufficient supply of relatively cool air is provided to the engine. However, this configuration permits snow and other debris to flow relatively easily into the collection chamber 14, thus accumulating and retarding the engine airflow.

To alleviate any constriction and maintain a sufficient airflow to the engine 11, a secondary inlet 36 is provided. More specifically, the secondary inlet 36 is coupled with the housing 12 to define a second flow path 38 to the filter 16, despite any accumulated debris in the collection chamber.

The housing 12 defines an opening 40 in the bottom wall 24 to receive the secondary inlet 36. More specifically, the secondary inlet 36 includes a conduit 42 located within the collection chamber 14 to deliver air directly to the filter 16.

The conduit 42 includes a first end 44 connected to the housing 12 adjacent to the opening 40 and a second end 46 that engages the filter 16. An inner surface 43 of the conduit 42 defines a bypass passageway extending between the ends 44, 46. Therefore, air flowing to the engine 11 via the secondary inlet 36 flows through the opening 40, into the conduit 42 along the second flow path 38, and directly into the filter 16, bypassing the collection chamber 14. Under this configuration, the secondary inlet 36 provides an unobstructed pathway through the filter 16 and to the engine 11 despite any compacted debris, such as snow or ice, that might be located within the collection chamber 14.

Figure 2A:
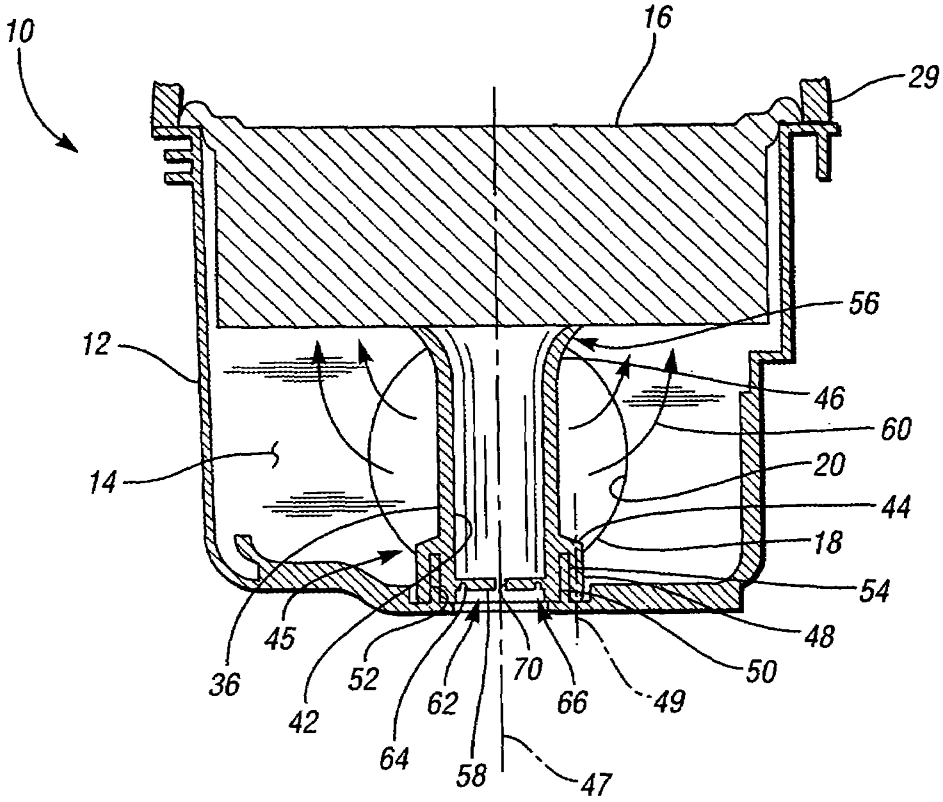
FIG. 2*a* is a cross-sectional view generally taken along line 2-2 in FIG. 1 showing the secondary inlet with the portions in a closed position.

Referring now to FIG. 2*a*, a specific construction for secondary inlet 36 is disclosed therein. The first end 44 of the secondary inlet 36 includes a connecting portion 45 connected to the housing 12. More specifically, the first end 44 includes an outer rim 48 and a conduit body 50 cooperating to define a channel 52 there between and extending around the body 50 of the conduit 42. The outer rim 48 extends in a direction 49 substantially parallel to the central longitudinal axis 47 such that the outer rim 48 and the body 50 of the conduit 42 are parallel with each other. The housing 12 includes an upstanding circular flange 54 that is received in the channel 52 in a press-fit connection there between. This press-fit connection substantially prevents air from leaking into the collection chamber 14.

The second end 46 of the conduit 42 is flared and includes an increased diameter portion 56 abutting the filter 16. This prevents the filter 16 from becoming obstructed by snow and debris from the chamber 14 in the vicinity of the conduit 42. The second end 46 of the conduit 42 may alternatively include a sealing means to prevent air flow from leaking into the collection chamber 14.

Alternatively, the secondary inlet 36 consists merely of the opening 40 defined by the housing 12. In an alternative design, the secondary inlet 36 includes a conduit 42 located outside of the collection chamber 14 and extending away from the housing 12. In yet another alternative design, the secondary inlet 36 extends into the collection chamber 14, but does not abut the filter 16. In this latter configuration, the conduit 42 is connected to the housing at the first end 44 and the second end 46 is a free end located within the collection chamber 14 generally adjacent the filter but not necessarily abutting the filter.

The secondary inlet 36 shown in FIG. 2*a* includes a plurality of door portions 58 to selectively prevent air from flowing through the conduit 42 when the air flow would be undesirable. More specifically, when the collection chamber 14 is substantially unobstructed, as shown in FIG. 2*a*, and a primary air flow 60 is permitted to flow through the primary inlet 18 at a sufficient level for engine requirements and the door portions 58 are in a closed position 62. The door portions 58, when in the closed position 62, generally obstruct the secondary inlet 36, thus minimizing NVH and maximizing engine efficiency as discussed above.

The door portions 58 include a pivoting means such as a weakened region 64 near the base of each of the door portions 58. The weakened region 64 has a reduced thickness 66 compared to the remainder of the door portions 58 such that the door portions 58 pivot about the weakened region 64.

Figure 3:
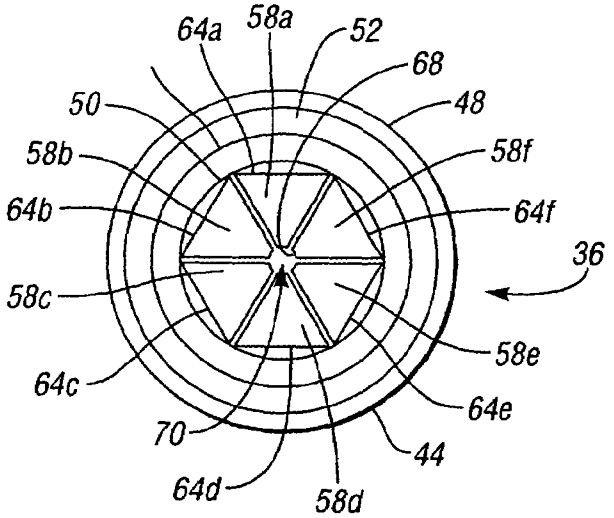
FIG. 3 is a bottom-view of the secondary inlet shown in FIG. 1.

Alternatively, the doors 58 pivot about a non-unitary pivoting means, such as hinges known in the art. The hinges may include a first component connected to the conduit 42 and a second component pivotably received by the first component and connected to the door 58. Referring now to FIG. 3, the secondary inlet 36 is illustrated as having six door portions 58*a*, 58*b*, 58*c*, 58*d*, 58*e*, and 58*f*, each of which has a generally triangular shape so as to cooperate and substantially obstruct the secondary inlet 36 when in the closed position 62. Each of the door portions 58*a-f* includes a weakened region 64*a*, 64*b*, 64*c*, 64*d*, 64*e*, and 64*f* having an equally reduced thicknesses such that all of the doors 58*a-f* will open substantially simultaneously. Each of the respective door portions 58*a-f* also includes a redacted tip 68 such that the door portions 58*a-f* cooperate to define a drain hole 70 positioned near the center of the secondary inlet 36. The drain hole 70 permits melted snow and other debris to drain from the secondary inlet 36, thus minimizing build-up of debris and moisture within the conduit 42.

The door portions 58, the weakened regions 64, and the conduit 42 are formed as a single, unitary component. The outer rim 48 is also a unitary portion of the single component.

Figure 2B:
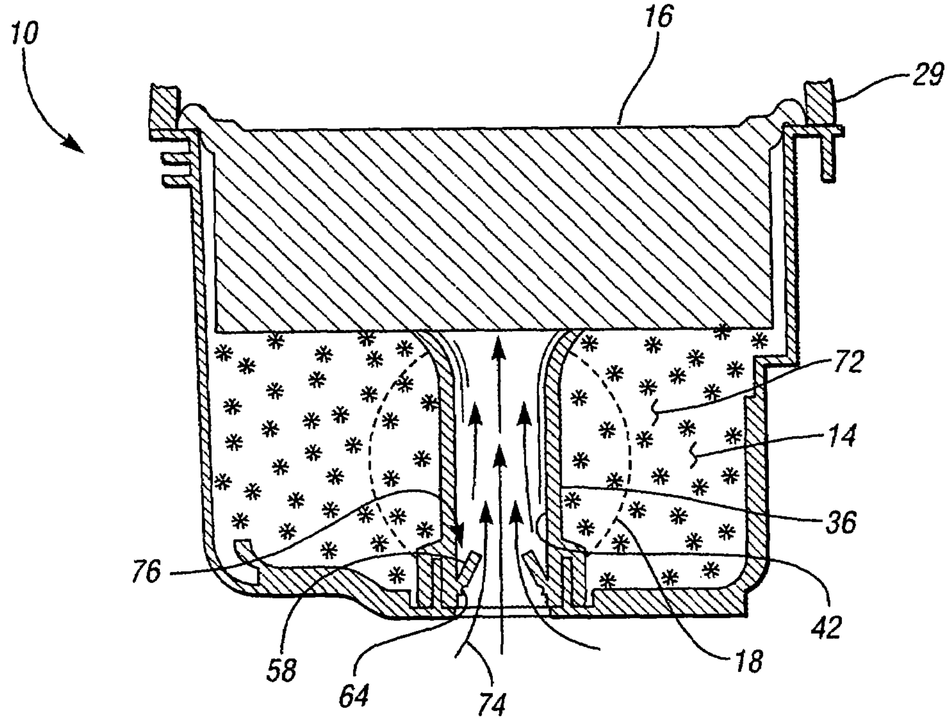
FIG. 2*b* is a cross-sectional view, similar to FIG. 2*a*, showing the air cleaner collection chamber obstructed by compacted snow and showing the door portions in an open position.

As seen in FIG. 2*b*, the collection chamber 14 is shown substantially obstructed by compacted snow 72 such that the engine 11 is unable to receive a sufficient amount of air flow through the primary inlet 18. As a result of the insufficient air flow, the engine 11 draws a secondary air flow 74 into the air intake system. More specifically, when the airflow to the engine 11 reaches a critical level, a naturally-formed vacuum within the engine 11 forces the door portions 58 into an open position 76 and draws the secondary air flow 74 into the conduit 42, through the filter 16, and to the engine 11. The door portions 58 pivot about the respective weakened regions 64 into the open position 76. The dimensions of the secondary inlet 36 are designed such that the secondary air flow 74 is sufficient for all engine operating conditions. Furthermore, the stiffness of the door hinge means is designed such that the doors 58 open when the engine reaches the critical level.

Figure 4:
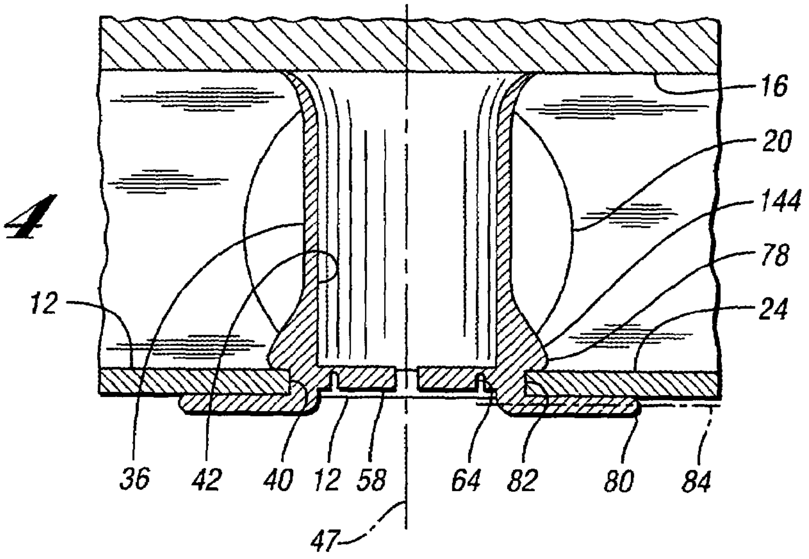
FIG. 4 is a cross-sectional view of an alternative embodiment of the present invention.

Referring now to FIG. 4, an alternative embodiment of the present invention is shown. Therein, the secondary inlet 36 includes a first end 144 having a ridge portion 78 and a flange portion 80 defining an annular groove 82 that receives the portion of the housing bottom wall 24 defining the opening 40. The flange portion 80 includes an outer diameter greater than the inner diameter of the opening 40 to permit the engagement of the conduit 42 with the housing 12. The flange portion 80 extends in a direction 84 substantially perpendicular to the central longitudinal axis 47 of the conduit 42 such that the flange portion 80 is adjacent the bottom-wall 24 of the housing 12.

Figure 5:
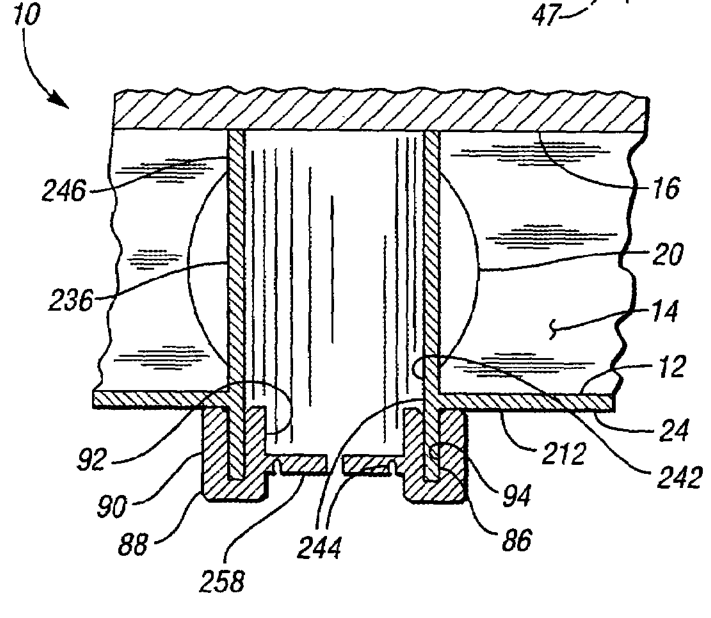
FIG. 5 is a cross-sectional view of yet another alternative embodiment of the present invention.

Referring now to FIG. 5, yet another alternative embodiment of the present invention is shown. Herein, a housing 212 of the air cleaner 10 is formed as a single unitary component with the secondary inlet 236. The secondary inlet 236 includes a second end 246, abutting the filter 16, and a first end 244, having a flange 86 extending below the housing bottom wall 24 (outside of the chamber 14) to mate with a connecting cap 88. The connecting cap 88 includes a plurality of door portions 258 that substantially obstruct the conduit 242 when in a closed position, similarly to the embodiments described above, and pivot about weakened regions 244 to an open position. Furthermore, the connecting cap 88 includes an outer rim 90 and an inner rim 92 defining an annular groove 94 for receiving the flange 86 and securing the cap 88 to the housing 12.

An alternate use of the present invention is as a controlled pressure recovery (CPR) valve. As a CPR valve, the doors 58 are in the closed position 64 during normal engine operating ranges, permitting more precise NVH tuning and lower rise over ambient inlet temperatures during lower engine rotation speeds. At higher engine rotation speeds, such as at wide open throttle, the doors 58 move into the open position 76 due to suction forces from the engine. More specifically, the doors 58 move to the open position 76 when the airflow through the primary inlet is lower than the critical level. This can be achieved through proper configuration of the weakened regions 64 with respect to the critical level of air flow for the demand of the engine. When the doors 58 are in the open position 76 more air flows to the engine 11, thus enhancing engine performance. This configuration permits the engine induction system to have a lower pressure drop at wide open throttle while maintaining NVH tuning capability and low rise over ambient at the lower engine RPM's.

It is therefore intended that the foregoing detailed description be regarded as illustrative rather than limiting, and that it be understood that it is the following claims, including all equivalents, that are intended to define the spirit and scope of this invention.

What is claimed is:

1. An air cleaner for a motor vehicle comprising:

a housing having side walls and a bottom wall defining a chamber;

a filter received within the chamber, the filter dividing the chamber and cooperating with the housing to define a collection chamber;

a primary inlet defining a primary passage into the collection chamber;

a secondary inlet defining a bypass passage to the filter, the bypass passage extending through and bypassing the collection chamber.

2. An air cleaner as in claim 1, the secondary inlet including a conduit having a first end and a second end, wherein the second end abuts the filter.

3. An air cleaner for a motor vehicle comprising:

a housing having side walls and a bottom wall defining a chamber;

a filter received within the chamber, the filter cooperating with the housing to define a collection chamber;

a primary inlet defining a primary passage into the collection chamber;

a secondary inlet defining a bypass passage to the filter, the bypass passage bypassing the collection chamber, the secondary inlet including a conduit having a first end and a second end, wherein the second end abuts the filter; and a connecting portion connecting the housing and the conduit adjacent to the first end of the conduit.

4. An air cleaner as in claim 3, wherein the conduit extends along a longitudinal axis, and wherein the connecting portion includes a flange engaging a portion of the housing and extending in a direction substantially parallel to the longitudinal axis.

5. An air cleaner as in claim 3, wherein the conduit extends along a longitudinal axis, and wherein the connecting portion includes a flange engaging a portion of the housing and extending in a direction substantially perpendicular to the longitudinal axis.

6. An air cleaner as in claim 2, wherein the conduit and the housing are a single, unitary component.

7. An air cleaner as in claim 6, further comprising a door element positioned with respect to the secondary inlet such as to substantially obstruct the secondary inlet when the door is in a closed position, wherein the door is pivotable to an open position if an airflow through the primary inlet is lower than a critical level.

8. An air cleaner as in claim 7, further comprising a connecting cap supporting the door, the connecting cap including a slot for receiving a portion of the conduit.

9. An air cleaner for a motor vehicle comprising:

a housing having side walls and a bottom wall defining a chamber;

a filter received within the chamber, the filter dividing and cooperating with the housing to define a collection chamber;

a primary inlet at least partially defining a primary flow path to the filter, a secondary inlet at least partially defining a second flow path to the filter, the second flow path extending through and bypassing the collection chamber; and a door positioned with respect to the secondary inlet so as to generally obstruct the secondary inlet when the door is in a closed position, the door having a weakened portion, wherein the door is pivotable about the weakened portion to an open position if an airflow along the first flow path is lower than a critical level.

10. An air cleaner as in claim 9, wherein the door includes a plurality of door portions, each having a respective weakened region, wherein the door portions are pivotable about the respective weakened portions to an open position if the airflow along the first flow path is lower than the critical level.

11. An air cleaner as in claim 10, wherein the door portions have a generally triangular shape.

12. An air cleaner as in claim 9, wherein the door of the secondary inlet defines a drain hole.

13. An air cleaner as in claim 9, the secondary inlet including a conduit extending through the collection chamber.

14. An air cleaner as in claim 13, wherein the conduit and the door are a single unitary component.

15. An air cleaner as in claim 13, wherein the conduit and the housing are a single, unitary component.

16. An air cleaner as in claim 13, the conduit including a first end and a second end, wherein the second end abuts the filter such that the second flow path bypasses the collection chamber.

17. An air cleaner as in claim 13, further comprising a connecting portion connecting the housing and the conduit adjacent to a first end of the conduit.

18. An air cleaner as in claim 17, wherein the conduit extends along a longitudinal axis, and wherein the connecting portion includes a flange engaging a portion of the housing and extending in a direction substantially parallel to the longitudinal axis.

19. An air cleaner as in claim 18, wherein the conduit extends along a longitudinal axis, and wherein the connecting portion includes a flange engaging a portion of the housing and extending in a direction substantially perpendicular to the longitudinal axis.

* * * * *